United States Patent [19]
Takahashi

[11] Patent Number: 5,361,325
[45] Date of Patent: Nov. 1, 1994

[54] FUZZY SYLLOGISTIC SYSTEM

[75] Inventor: Kousuke Takahashi, Yokohama, Japan

[73] Assignee: NEC Research Institute, Inc., Princeton, N.J.

[21] Appl. No.: 144,488

[22] Filed: Nov. 1, 1993

Related U.S. Application Data

[63] Continuation of Ser. No. 858,557, Mar. 27, 1992, abandoned.

[51] Int. Cl.$^5$ .............................................. G06C 7/12
[52] U.S. Cl. ........................................ 395/3; 395/61; 395/900
[58] Field of Search ...................... 395/3, 61, 916, 900

[56] References Cited

U.S. PATENT DOCUMENTS

| | | | |
|---|---|---|---|
| 4,860,214 | 8/1989 | Matsuda et al. | 395/900 |
| 4,912,648 | 3/1990 | Tyler | 395/61 |
| 5,109,380 | 1/1992 | Ogino | 395/913 |
| 5,136,685 | 8/1992 | Nagazumi | 395/3 |
| 5,167,005 | 11/1992 | Yamakawa | 395/3 |
| 5,175,795 | 12/1992 | Tsuda et al. | 395/3 |
| 5,214,653 | 5/1993 | Elliot, Jr. et al. | 395/916 |

OTHER PUBLICATIONS

Barnden, J. A., "Simulations of Composit, a Supra-Connectionist Architecture for Commonsense Reasoning", Proceeding The 2nd Symposium on the Fronties of Massively Parallel Computation; pp. 311-315 10-12 Oct. 1988.

Hau, H. Y.; Kashyap, R. L., "Belief combination and propagation in a lattice-structured interference network", IEEE Transaactions on systems, Man and Cybernetics; vol. 20 Iss: 1 pp. 45-57; Jan. Feb. 1990.

*Primary Examiner*—Allen R. MacDonald
*Assistant Examiner*—Tariq Hafiz
*Attorney, Agent, or Firm*—Arthur J. Torsiglieri; Philip J. Feig

[57] ABSTRACT

A fuzzy syllogistic system that provides the confidence value of a chain of inferences based on the concept that the truth or confidence value of the major premise of a syllogism connecting the minor premise and a major premise can serve as the confidence value of the syllogism so long as this confidence value is larger than the complement or negation of the truth or confidence value of the minor premise. By the use of storage cells and a switch appropriately clocked, a single pair of basic elements is made to handle a multilink chain of inferences.

2 Claims, 3 Drawing Sheets

FUZZY SYLLOGISTIC SYSTEM

This is a continuation of application Ser. No. 07/858,557 filed Mar. 27, 1992 now abandoned.

INTRODUCTION

This invention relates to fuzzy information processing systems using syllogistic techniques to reach conclusions when supplied with fuzzy or inconclusive information.

BACKGROUND OF THE INVENTION

In a copending application Ser. No. 759,489 filed Sep. 13, 1991 and assigned to a common assignee, there is disclosed a system, described as a fuzzy syllogistic system that utilizes a circuit called an inference block in which separate first and second input terminals are provided respectively with a first analog signal whose amplitude is linearly related to the truth measure of the minor premise of the syllogism and with a second analog signal whose amplitude is linearly related to the truth measure of the major premise to yield an output whose amplitude is that of the second analog signal so long as the amplitude of the second analog signal is at least as great as the value of the complement of the first analog signal and preferably greater than the value of the complement by a prescribed amount that can be chosen to compensate for noise in the system. If this inequality is not satisfied, it is concluded that the truth value of the minor premise is insufficient to reach an inference from the major premise. This application is incorporated herein by reference.

Moreover, for use when the fuzzy information system involves a multistage link chain of inferences, as is often the case in real life situations, there is included a separate inference block for each inference of the chain paired with a special circuit that provides as an output the smaller of two input analog signals. The separate inference blocks each with its paired special circuit are connected in a chain with the output of a preceding inference block supplying one input to the subsequent inference block and the other input being supplied with the truth measure of the major premises of the successive inferences. This system will be discussed more fully in connection with FIG. 1 of the drawing.

Such a system can be relatively complex when used with a chain of several or more sequential inferences. A possible application of a system of this kind is as a control for a process that includes a sequence of interrelated operations or measurements whose accuracy or confidence values are less than unity and some measure of the confidence in the final measurements or guestimates of the process is desirable.

SUMMARY OF THE INVENTION

The present invention uses a single stage comprising an inference block and a circuit for providing as its output of the smaller of two input signals together with various storage cells and switches to handle a chain of inferences, each inference of the chain being examined in turn.

The invention will be better understood from the following more detailed description taken in conjunction with the accompanying drawing.

DETAILED DESCRIPTION OF THE INVENTION

Figure 1:
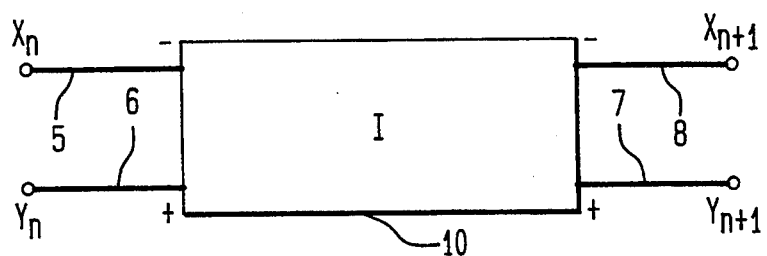
FIG. 1 shows the symbol to be used to designate the inference block that is a basic feature of the invention.

It will be helpful to begin by a review of the principles of the original invention for use as background towards an understanding of the present invention.

The objective of fuzzy inference is to obtain some properties of the fuzzy functions $B_1, B_2, \ldots$ from similar properties of the fuzzy functions $A_1, A_2, \ldots$ when these functions can be related according to an inference scheme $$A_1, A_2, \ldots \rightarrow B_1, B_2, \ldots \tag{1}$$

where the A are antecedents and the B consequents of the inference whose truth or confidence measure is between zero and one because of the unavailability of complete information as to the truth of the inference governed by a collection of rules of inference. In classical logic this can be accomplished in a variety of equivalent procedures based on combinations of both logic operations and modus ponens. Extensions of these procedures to fuzzy logic have been less successful: many lack contraposition $(A \Rightarrow B) = (B' \Rightarrow A')$; none reproduce reduction ad absurdum (rada) $(A \Rightarrow B, A \Rightarrow B') \rightarrow A'$. There are, of course, applications where such properties may be inappropriate, even undesirable; however, even the lack of a law of excluded middle should not prevent the formulation of a method of fuzzy inference which captures these fundamentally essential features of classical logic.

In approaching inference it is natural to try to derive conclusions from premises using logic operations. For example, to construct a modus ponens (i.e., assuming the major premise $A \Rightarrow B$ and the minor premise A are valid to conclude B is valid)

$$(A, A \Rightarrow B) \rightarrow B \tag{2}$$

one could try $$A \wedge (A \Rightarrow B) \tag{3}$$

or even $$(A \wedge (A \Rightarrow B)) \Rightarrow B \tag{4}$$

However, in classical logic $(A \wedge (A \Rightarrow B)) = (A \wedge B) \neq B$, while $((A \wedge (A \Rightarrow B)) \Rightarrow B) = 1$. Thus, while both explanations are understandable, (the first saying that to obtain B, we must have a valid A, the second indicating that this expression is a tautology, valid even if $A=B'$), neither can really be said to represent the heart of modus ponens. On the other hand, the classical statement, "If A is true and if A implies B is true, then B is true," is simple, direct, and, if B can be extracted (detached) from $A \Rightarrow B$, effective. But, most importantly, it involves an operation outside of the logic operations (and ($\wedge$), or ($\vee$), negation ('), etc.), but of course, not outside of logic. Let us now capture this important aspect in fuzzy logic.

To achieve modus ponens for fuzzy logic, we must be able to derive the fuzzy function B from the fuzzy functions A and $A \Rightarrow B$. All fuzzy functions are, of course, functions of elements associated with fuzzy sets, and need not be the same element when taken in combination. For example, we can have $A(x) \Rightarrow B(x)$ or $A(x) \Rightarrow B(y)$ depending on the problem of interest. For sake of brevity we occasionally write $A_x$ for $A(x)$, etc. The logic operation $A \Rightarrow B$ we represent as $A' \vee B$, since this form preserves the meaning of implication: when true, if A is true then B is true. For $A \vee B$ we choose maximum (A,B), for $A \wedge B$ we choose minimum (A,B), for $A'$ we choose 1-A, a common choice since the beginning of fuzzy logic and one which satisfies all the standard properties of logic connectives except the laws of excluded middle and noncontradiction. In what follows $A \vee B$ means the logic OR if reference is to logic, set union if reference is to set theory and mx(A,B) if reference is to fuzzy logic. Similarly $A \wedge B$: AND, intersection, mn(A,B); $A'$: negation, complement, 1-A.

Returning finally to modus ponens, given $(A \Rightarrow B) = mx(A', B)$, clearly if $(A \Rightarrow B) > A'$ then $B = (A \Rightarrow B)$. Thus if we know $(A \Rightarrow B)$ and A, we calculate $A' = 1-A$ and compare $(A \Rightarrow B)$ with $A'$. If the former is strictly larger, than we infer that $B = (A \Rightarrow B)$. We write this as follows:

$$(A, A \Rightarrow B) \rightarrow B = (A \Rightarrow B) >_w A' \quad (5)$$

where the "$>_w$" symbol (as in $X >_w Y$) reminds us that the preceding equality is valid whenever $X > Y$. Note that for $(A \Rightarrow B) = A'$, $B (\leq A')$ is (otherwise) undeterminate. (The case $(A \Rightarrow B) < A'$ is impossible.) Put another way, for $B > A'$, which includes all the most useful region ($\frac{1}{2} < (A,B) \leq 1$), and in fact half of all possible values for (A,B), $0 < A' < B \leq 1$, B can be readily extracted from $A \Rightarrow B$. In words this has a strong intuitive ring: the larger A, the smaller $A \Rightarrow B$ need to trigger inference, or the smaller A, the larger $A \Rightarrow B$ must be to permit inference: $B = (A \Rightarrow B) >_w A'$ captures this inverse relationship.

With this background we can discuss circuit implementations of fuzzy syllogistic systems.

First FIG. 1 shows a symbol 10 to be used for representing the circuit used for the basic inference function involved. It comprises input terminals 5 and 6 supplied with input signals $X_n$ and $Y_n$ and output terminals 7 and 8 supplying output with signals $X_{n+1}$ and $Y_{n+1}$. $X_n$ corresponds to an analog signal with an amplitude between 0 and 1 that is a measure of the truth, or confidence in validity, of the minor premise involved. $Y_n$ corresponds to an analog signal with an amplitude between 0 and 1 that is a measure of the truth, or, confidence in validity, of the major premise. $X_{n+1}$, which will be termed the fidelity and should have a positive value for a valid inference to be reached, corresponds to an analog signal that is a measure of the difference between $Y_n$ and $X'_n$ where $X'_n$ is the negation or complement (1 $-X_n$) of $X_n$. $Y_{n+1}$ is equal to $Y_n$ but is valid only if $X_{n+1}$ is greater than some arbitrary threshold, which may be as small as zero, although it may be chosen to have a positive value to compensate for noise or other factors to increase the reliability of the inference. It will be convenient hereinafter to describe this circuit as an inference block and to represent it by the symbol 10 as shown. For ease of exposition terminals 5 and 7 are described as the negative terminals and terminals 6 and 8 as the positive terminals.

Figure 2:
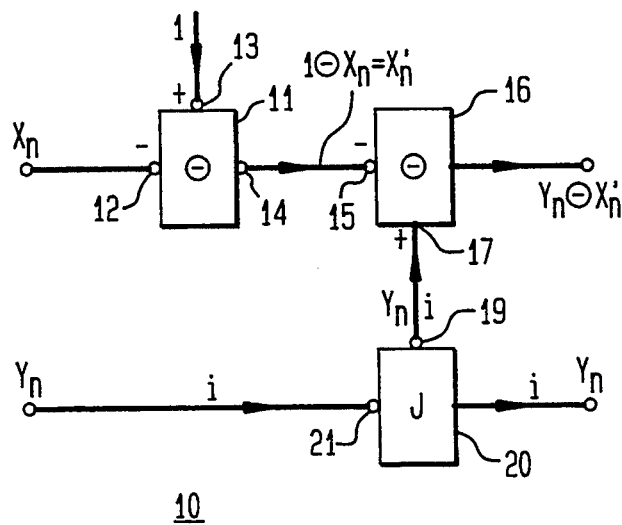
FIG. 2 shows in block schematic form the components of an inference block.

FIG. 2 shows in block schematic one form of circuit suitable for carrying out the function represented by symbol 10 of FIG. 1. It includes a bounded difference circuit 11 to which is supplied at its negative input terminal 12 with the current value of $X_n$ and at its positive input terminal 13 a current of unit value to provide at its output $X'_n$ the complement or negation of $X_n$. The output terminal 14 of circuit 11 is directly connected to the negative terminal 15 of a bounded difference circuit 16 similar to circuit 11 whose positive input terminal 17 is supplied by the input current $Y_n$. In the circuit depicted, the input current $Y_n$ is supplied by way of an output terminal 19 of a current amplifier 20 whose input terminal 21 is supplied with current $Y_n$. The current amplifier 20 also provides a replica of this current at its output terminal. The use of the current amplifier 20 makes $Y_n$ available for use in additional circuitry, as will be explained below. If this replica $Y_n$ is not needed, $Y_n$ could be directly supplied to input terminal 17 without the insertion of the current amplifier 20.

Each of circuits 11, 16 and 20 can be of any form known in the art suitable for such functions. Examples of such circuits are described in the U.S. Pat. No. 4,875,184 of T. Yamakawa and his paper entitled "Fuzzy Hardware Systems of Tomorrow" that appeared in a book entitled "Approximate Reasoning in Intelligent Systems, Decision and control" Pergamon Press (London) 1987, both of which are mentioned in the earlier identified copending application. It can be noted that circuits 11 and 16 basically are subtracting circuits.

Figure 3:
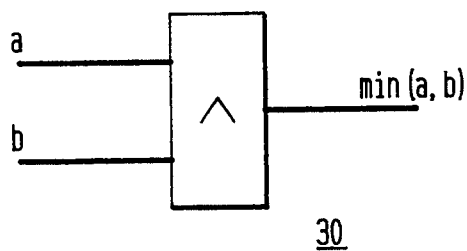
FIG. 3 shows the symbol to be used for a particular circuit important to the invention when a chain of implications is involved.

FIG. 3 shows another block symbol 30 to be used for representing a circuit which, when provided with inputs a and b, will provide as the output the smaller of the two. It will be convenient hereinafter to describe this circuit as a minimum extractor circuit and to represent it by the symbol 30 shown.

Figure 4:
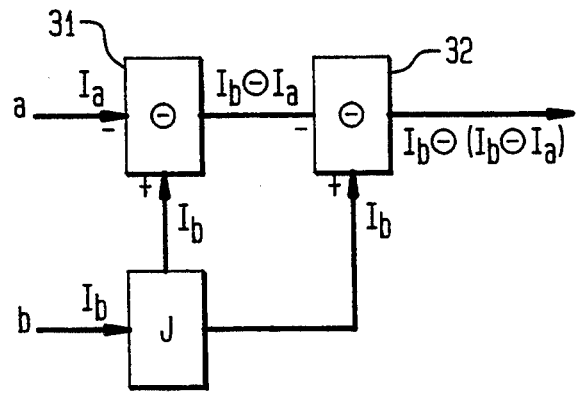
FIG. 4 shows in block schematic form the components of the circuit represented by the symbol of FIG. 3.

FIG. 4 shows in block schematic form a circuit suitable for providing the minimum function represented by symbol 30 of FIG. 3. It includes bounded difference circuits 31 and 32 similar to circuits 11 and 16 and current amplifier circuit 33 similar to current amplifier circuit 20 in the circuit arrangement of FIG. 2. Circuit 31 is connected so that it will provide as an output $I_b - I_a$ when $I_a$ is smaller than $I_b$ but otherwise zero, and this output is supplied to circuit 32 that will provide as an output $I_b$ when $I_b$ is smaller than $I_a$ and $I_b \ominus (I_b \ominus I_a)$ or $I_a$, when $I_a$ is smaller than $I_b$. The patent to Yamakawa describes other possible forms of minimum extractor circuit 30.

The foregoing circuits are designed to utilize the amplitude of signal currents as the measure of truth or confidence in the inferences involved. Alternatively, the amplitudes of voltages can be similarly used by choice of appropriate circuitry.

In some situations, a chain of implications is involved, more than one of which includes some uncertainty so that some fuzziness is involved. The present invention is especially well-equipped to handle such a chain expeditiously, particularly as compared to other schemes proposed for handling such situations.

Figure 5:
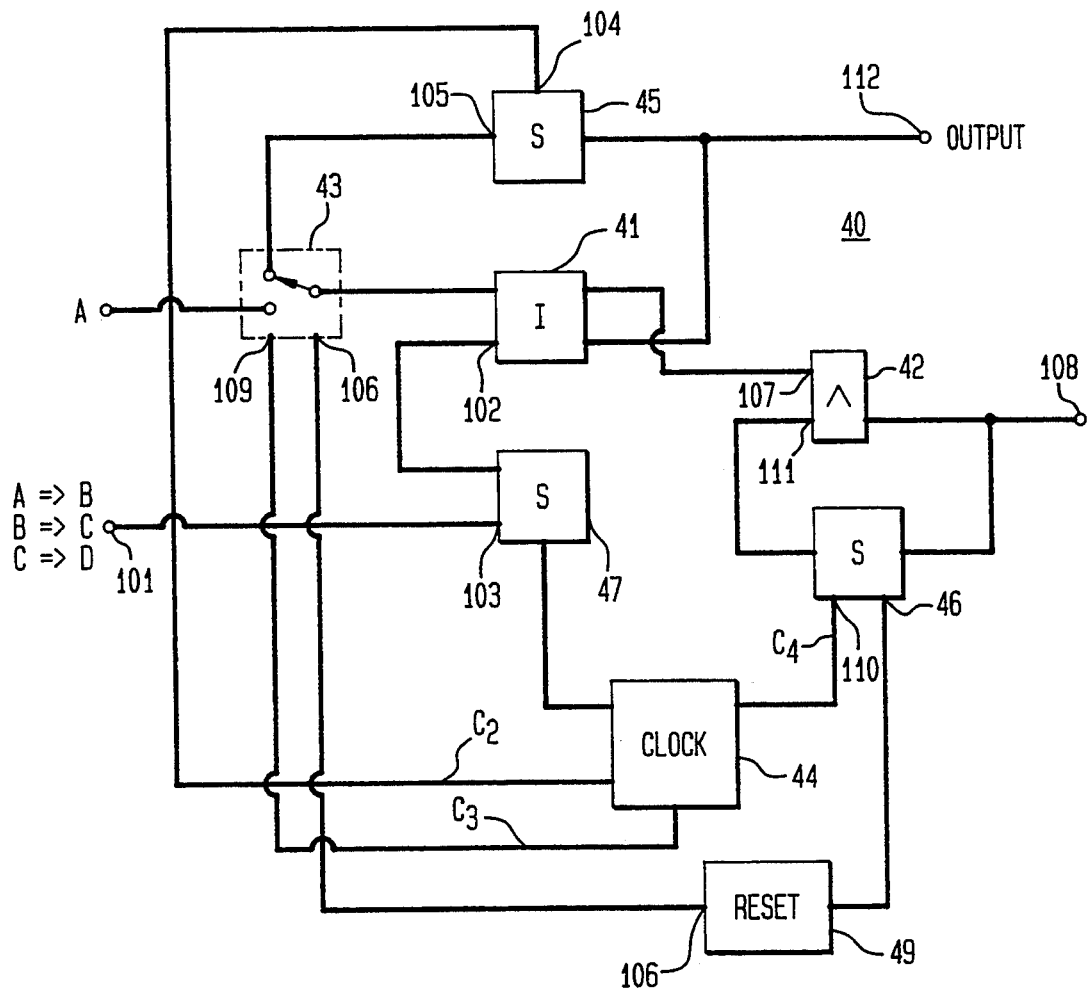
FIG. 5 shows an embodiment of the present invention.

FIG. 5 depicts a fuzzy syllogistic arrangement 40 in accordance with the invention that serves to provide at an output 112 an analog signal whose amplitude is a measure of confidence in the final major premise in a chain of implications and at an output 108 an analog signal whose amplitude is a measure of the fidelity of the consequent of the chain of inferences.

It includes the part formed by inference block 41 and minimum extractor circuit 42 and a variety of other circuit components that permit the single pair to handle the sequence of inferences. In this arrangement, the confidence factor in the initial or minor premise A, has an analog value between 0 and 1, is supplied to the negative input of the inference block 41 by way of the lower position of a two input position switch 43, the upper input position of which closes a feedback path to the negative input of inference block 41 from its positive output which provides the desired inference output. The analog values of the confidence measures of the major premises of the chain $A \Rightarrow B$, $B \Rightarrow C$, $C \Rightarrow D$ are supplied in sequence to the positive input terminal of the inference block 41 under the control of a clock signal provided by a suitable source 44 of clocking signals. Clock signals from clock generator 44 are used to control the various clocked storage cells 45, 46, 47 and the switch 43.

Each of these storage cells typically comprises a capacitor capable of storing an analog quantity together with a pair of electronic gates that can be opened or closed under the control of a clock signal. A suitable form of such a cell is shown in FIG. 6.

Figure 6:
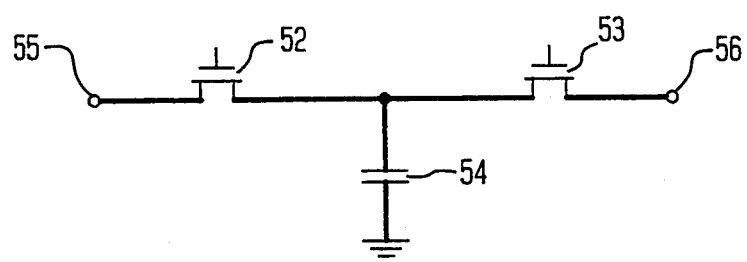
FIG. 6 shows a circuit schematic of a storage cell useful in the embodiment of FIG. 5.

As seen in FIG. 6, the cell includes a pair of field effect transistors 52 and 53 and a capacitor 54. The field effect transistors act alternately as open or closed switches under the control of clock signals applied to their gates. The two switches are operated out of phase so that when one is open the other is closed. When switch 52 is closed and an analog signal applied to terminal 55, the signal stores a corresponding charge in capacitor 54 which is unable to discharge so long as switch 53 is open. When switch 53 is closed and switch 52 is opened, the charge in capacitor 54 discharges to terminal 56. Accordingly, the cell acts to store an analog signal for time determined by the interval between the two switching operations.

Returning to FIG. 5, it is seen that stored cell 45 is connected between one input of the inference block and one output so that when switch 43 is in the upper position, the output which corresponds the confidence factor of the minor premise is carried over as one input in tile next inference of the chain. This is seen from the diagram of FIG. 7 when node 102 provides this output which is later developed on node 105 which corresponds to the upper position of switch 43.

It is also seen that the negative output 107 of tile inference block 41 supplies one input to tile minimum extractor circuit 42. This negative output corresponds to the bounded difference of the analog value of the first major premise and the negation of the confidence value of the minor premise which is the fidelity. The output node 108 of the minimum extractor circuit 42 serves as the output at which appears the confidence factor of as much of the chain as has been applied to the input node 101. Moreover, this output is also reapplied by way of storage cell 46 to the other input 111 of circuit 42. Essentially this serves to insure that one input into the minimum extraction circuit is the value of the smallest fidelity value of those already considered. In this way, the output 108 will reflect the lowest value of all fidelity measures generated by minimum circuit 42.

At the start of the operation, node 105 is started out as zero and node 111 is started out at the maximum value of unity by means of the reset circuit which represents any suitable means of impressing the requisite voltages at nodes 105 and 111 until the first chain of inferences has completed its passage through the inference block 41 and circuit 42.

Figure 7:
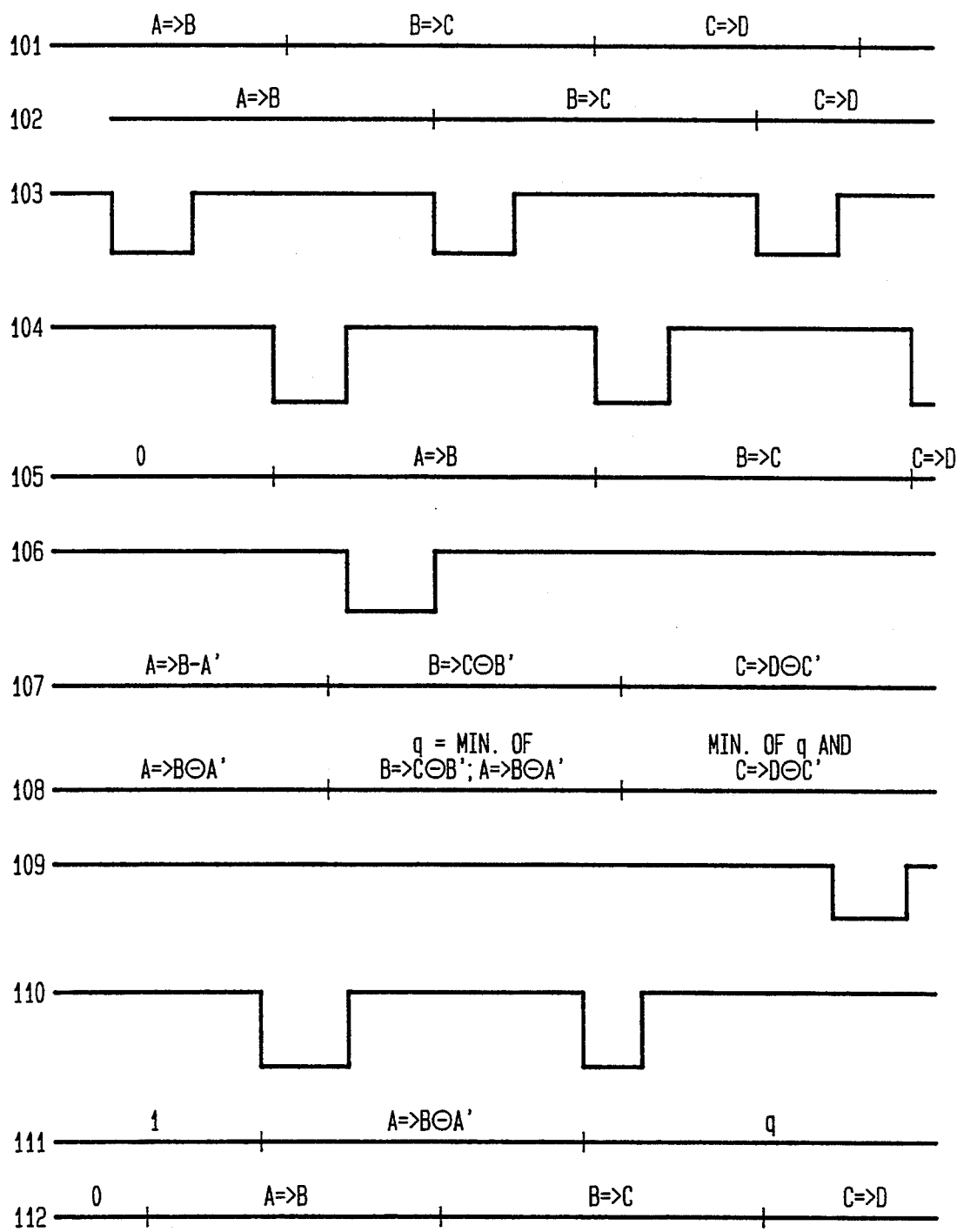
FIG. 7 shows the signal values at various times and at nodes in the system shown in FIG. 5.

FIG. 7 shows the changes that occur with time as the successive links of the chain of inferences are applied. The arrival rate of successive links needs to be synchronized with the timing of clock signals provided by clock source 44.

Specifically, FIG. 7 is a timing diagram illustrating the relationship of the various clocking signals and the data information inputs for the three link inference chain $A \Rightarrow B$, $B \Rightarrow C$, $C \Rightarrow D$ which are applied as the input to storage cell 47. The reference numerals 101–102 designate either the nodes or conductors involved.

To activate the system, the clock generator 44 is used to provide a reset signal R that is supplied both to switch 43 and to the storage cell 46. In particular, reset signal sets switch 43 so that the analog value of the major premise A is supplied to the input of inference block 41 and reset signal R also serves to set the signals stored in storage cell 45 and storage cell 47 at the unit value 1, the maximum value. At this time also a clocking pulse C, allows storage cell 47 to store the first input signal $A \Rightarrow B$ and this is transmitted to the other input terminal of inference block 41.

The main output of inference block 41 becomes one of the two inputs to the minimum circuit 42, the other of whose inputs has been initially set at unity by the reset clock R via storage cell 46.

The other output of inference block 41 is supplied to the storage cell 45.

The storage cell 45 will then store the signal supplied by inference block 41 which will in turn be supplied as an input to the inference block 41, after switch 43 has been switched to the up position. Switch 43 is switched back to the up position timed to occur at the time that $B \Rightarrow C$, the second input signal is supplied to the input terminal 101. To this end, resent circuit 49 is included and provided with conductors 106 and 109 to set and reset switch 43. This is initially in the lower position and then set to the upper position once the first output of inference block 41 has been established on storage cell 45. It is later reset to its lower position once the entire chain of inferences have been processed and the system is ready to start with a new chain.

The various power sources have not been shown and advantageously there should be included provision for setting the storage cells 45 and 46 at unity value initially first input signal of the inference block means after a delay timed to occur as the analog value of the confidence measure of the next inference in the chain is being substituted as the second input signal of the block inference means.

The specific arrangement of the various components shown in FIG. 5 is illustrative of the basic principles of the invention. Modifications should be possible without departing from the basic principles. In particular, for some applications it may be advantageous to utilize two or more systems of the kind in parallel.

Moreover, while it is convenient for purposes of exposition to describe the invention in terms of confidence values that have analog values between one and zero, it should be apparent that these values can be digitized and the various processing described can thereafter be done with such digitized values.

We claim:

1. Fuzzy logic circuitry for deriving the confidence measure and fidelity measure of the consequent of a chain of implications that include a minor premise antecedent and a plurality of interrelated major premises, each premise having a confidence measure, comprising:

inference means for receiving at a first input terminal an electrical signal corresponding to the confidence measure of the antecedent of an implication being evaluated and at a second input terminal an electrical signal corresponding to the confidence measure of the major premise of the implication being evaluated and for providing at a first output terminal a signal corresponding to the confidence measure of the consequent of the implication being evaluated and at a second output terminal the fidelity of the consequent, switching means for receiving signals corresponding to the confidence measures of the minor and major premises of implications in the chain and for supplying to said inference means said electrical signal corresponding to the confidence measure of the antecedents in the links in the chain of implications to said first input terminal and the electrical signal corresponding to the confidence measure of the major premises of the links in the chain of implications to said second input terminal, first means for receiving and storing electrical signals from said first output terminal corresponding to consequents in the chain of implications and supplying the stored electrical signals to the switching means as signals corresponding to the antecedents in links of the chain of implications subsequent to the first link, except for the consequent in the last link, which consequent serves as the output of the chain, and second means for receiving the electrical signals supplied at said second output terminal corresponding to the fidelity of the consequent and for storing the electrical signal corresponding to the fidelity of the consequent in the chain of implications having the lowest value and providing said electrical signal corresponding to the fidelity having the lowest value as the fidelity measure of the consequent in the last link of the chain of implications.

2. The fuzzy logic circuitry of claim 1 in which the inference means comprises a first circuit supplied for each link with the electrical signal received at the first input terminal for providing an electrical signal corresponding to the complement of the electrical signal received at the first input terminal and a second circuit supplied for receiving both the electrical signal at the second input terminal and the complement of the signal provided from said first circuit for providing the bounded difference of said both received signals for use as a fidelity measure of the consequent of such link.

* * * * *